United States Patent [19]

Kendall

[11] Patent Number: 4,580,528
[45] Date of Patent: Apr. 8, 1986

[54] FEEDING APPARATUS FOR ANIMALS

[75] Inventor: Graham J. Kendall, Henley Brook, Australia

[73] Assignee: Gunyah Nominees Pty. Ltd., Western Australia, Australia

[21] Appl. No.: 661,574

[22] Filed: Oct. 16, 1984

[51] Int. Cl.⁴ .......................... A01K 1/10; A01K 5/00
[52] U.S. Cl. .......................................... 119/53; 119/58
[58] Field of Search .................... 119/53, 53.5, 58, 59, 119/60

[56] References Cited

U.S. PATENT DOCUMENTS

| | | | |
|---|---|---|---|
| 69,976 | 10/1867 | Febles | 119/58 |
| 473,245 | 4/1892 | Taft et al. | |
| 493,040 | 3/1893 | Morse | 119/58 X |
| 2,056,814 | 10/1936 | Winn | 119/53 |
| 2,919,675 | 1/1960 | Beachy | 119/53 X |
| 3,067,722 | 12/1962 | Strong | 119/53.5 |
| 3,362,382 | 1/1968 | Frasier | 119/58 |
| 3,800,746 | 4/1974 | Stidham | 119/56 R |
| 3,885,524 | 5/1975 | Gregory | 119/58 X |
| 4,020,794 | 5/1977 | Nethery | 119/58 |
| 4,258,663 | 3/1981 | Schoessow | 119/58 |
| 4,278,049 | 7/1981 | Van Dusseldorp | 119/53.5 |
| 4,315,484 | 2/1982 | Kingery | 119/53 |

FOREIGN PATENT DOCUMENTS

| | | |
|---|---|---|
| 89432 | 8/1984 | Australia . |
| 935813 | 9/1963 | United Kingdom . |
| 2040661 | 9/1980 | United Kingdom . |

*Primary Examiner*—Robert P. Swiatek
*Attorney, Agent, or Firm*—Harness, Dickey & Pierce

[57] ABSTRACT

A feeding apparatus for animals, particularly horses, comprising:
- a hopper to contain particulate fodder having an upper and lower opening;
- a compartment adjacent the hopper to contain straw-like fodder having an outer perforate side and an upper opening;
- a trough disposed near the lower opening of the hopper to receive fodder discharged from the hopper by gravity feed action; and
- a lid to cover both the upper openings the hopper and compartment are separated by an upstanding partition member and the perforate side generally overlies the trough to enable an animal to feed from both the compartment and trough.

11 Claims, 6 Drawing Figures

FEEDING APPARATUS FOR ANIMALS

This invention relates to a feeding apparatus for animals and in particular horses.

Various forms of feeding devices are known for sheep and cattle which can be used in an open field without replenishment of the feed contained therein over relatively long periods of time. However, such devices do suffer from several deficiencies when used with equine stock. Horses tend to prefer at least two different types of fodder, usually hay or straw and also chaff or grain. With prior art devices it is generally not possible to make available these two types of fodder from the one apparatus, due to the different consistencies of the feed. Furthermore, in order to provide satisfactory feeding over relatively long periods of time, it is necessary for the device to include storage means, for storing and protecting relatively large quantities of feed from the elements, in addition to providing controlled access to the feed.

Another problem which becomes apparent with a feeding device incorporating both storage and access facilities for two different feed types, is the desirability of replenishing or 'topping' one feed type independently from the other feed type and minimising the interaction between the two during such times. This aspect is particularly important in relation to the feeding of horses, where it is noted that when the feed for a horse has been disturbed to the extent of contacting a foreign substance such as the ground, the animal is reluctant to consume the feed thereafter.

Another consideration in providing a feeding apparatus having different types of feed, is the optimization of storage space for each type of feed.

It is an object of the present invention to provide an improved feeding apparatus for horses in particular, which can provide at least two different types of feed simultaneously, one being of particulate material, and other being straw-like.

It is a further object of the invention to provide means for independently filling or replenishing at least two storage compartments thereof.

It is another object of the present invention to allow animals access to feed contained within each storage compartment.

It is a further object of the invention to provide a feeding apparatus which includes means for protecting the contents thereof from the elements.

It is a preferred object of the invention to provide optimum storage space for both types of feed.

In one form the invention resides in a feeding apparatus for animals comprising:
  a hopper to contain particulate fodder having an upper and lower opening;
  a compartment adjacent said hopper to contain straw-like fodder having an outer perforate side and upper opening;
  a trough disposed near the lower opening of said hopper to receive fodder discharged from said hopper by gravity feed action; and
  a lid to cover both said upper openings; wherein said hopper and compartment are separated by an upstanding partition member and said perforate side generally overlies said trough to enable an animal to feed from both the compartment and trough.

According to a preferred feature of the invention, the feeding apparatus has compartments disposed at more than one side of said hopper, each separated on its inner side from said hopper by a said partition member.

According to another preferred feature, the feeding apparatus has troughs each with an associated lower opening of the hopper disposed at more than one side of said hopper.

According to another preferred feature, the partition is generally inclined in cross-section to provide optimum storage facility for the compartment in the region of the upper opening thereof and optimum storage facility for the hopper in the region of the lower opening thereof.

According to another preferred feature, the upper opening of said hopper is funnel shaped to facilitate filling of the hopper and to augment the optimum storage facility of said compartment.

According to another preferred feature, the lid is pivotally mounted to the apparatus about a horizontal axis.

According to another preferred feature, the lid comprises a cover and linkage, said cover being pivotally connected to one end of said linkage to provide pivotal movement about a horizontal axis, and the other end of said linkage being pivotally connected to the assembly to provide pivotal movement about a second horizontal axis, whereby the cover may be moved independently from or in conjunction with said linkage to facilitate access to said upper openings from either side of the apparatus.

The invention will be better understood by reference to the following description of several specific embodiments thereof. The description is made with reference to the accompanying drawings wherein.

The first and second embodiments are substantially the same in most aspects apart from the lid and hence the same reference numerals have been used in the description and the drawings of both embodiments to identify substantially similar components of the feeding apparatus in each case.

The first embodiment is directed towards a feeding apparatus for horses which essentially allows for a number of horses to feed therefrom at the same time and further includes provision for storage of two basic types of fodder, namely hay and grain.

Figure 1:
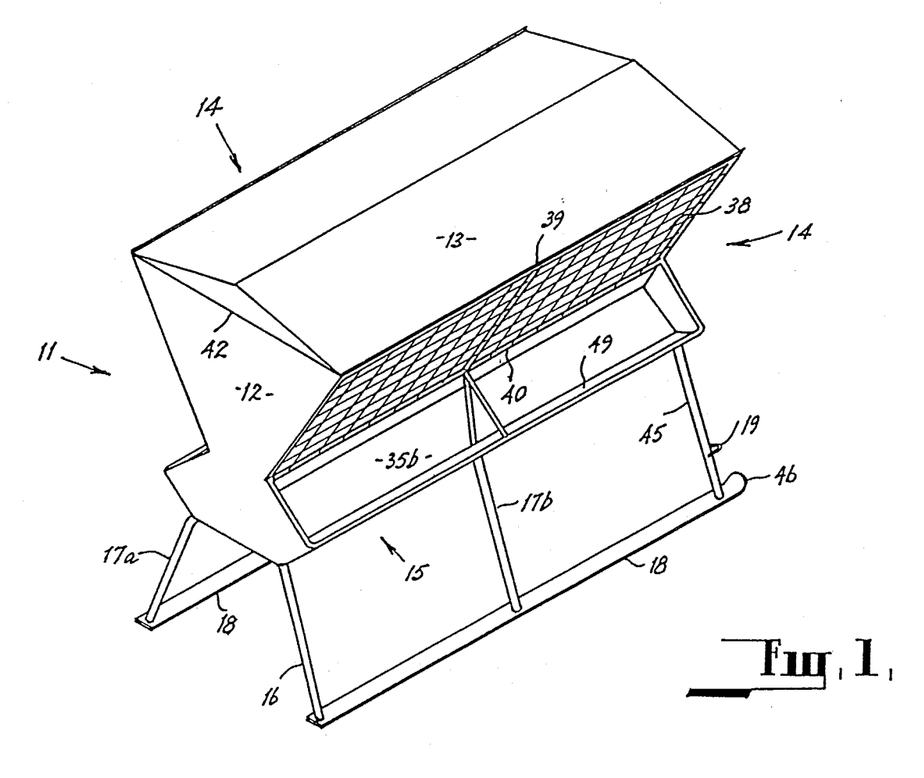
FIG. 1 is a perspective view of the feeding apparatus according to the first embodiment.
Figure 2:
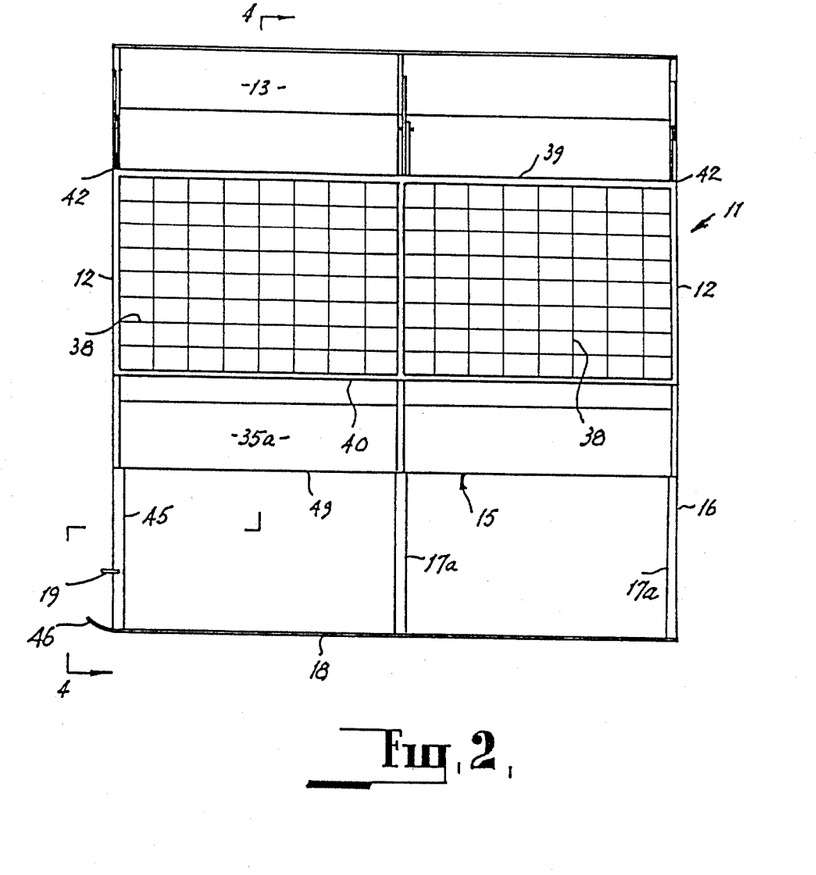
FIG. 2 is a side elevation of the feeding apparatus in FIG. 1 with the lid thereof opened.

A housing shown generally at 11, comprises end walls 12, a covering lid 13, sides shown generally at 14, and a base 15. The housing 11 is mounted upon a supporting framework 16 which includes pairs of legs 17 mounted at the ends and the middle of the housing. Corresponding legs 17a or 17b of each of the pairs of legs are connected to corresponding elongate skid members 18 placed at opposite sides of the housing to assist in the transport of the feeding apparatus. In addition, brackets 19 are attached to each leg of a leading pair of legs 45 positioned at the skid ends which have curved portions 46 to further facilitate transport of the apparatus.

The housing 11 is adapted to include side compartments 20, located at either side of the housing and a central hopper 21.

Figure 4:
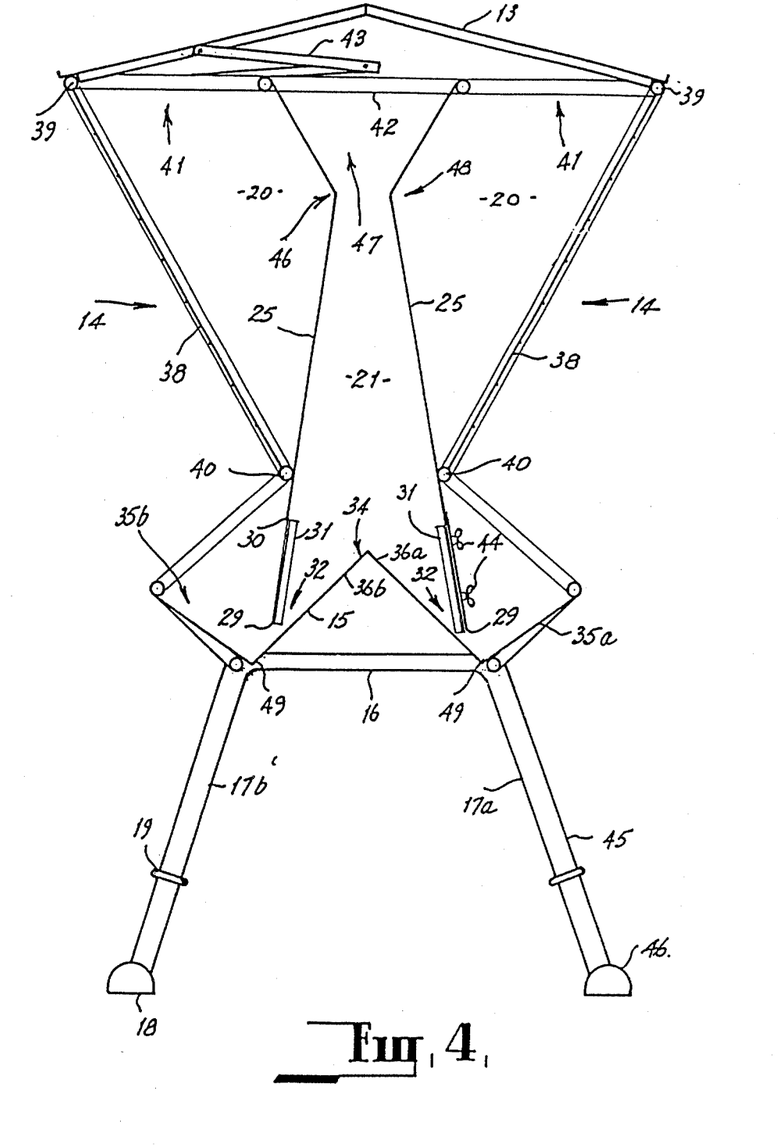
FIG. 4 is a sectional view taken along line 4-4 of FIG. 2.

The side compartments 20 are disposed adjacent the hopper 21 and are separated therefrom by opposingly inclined partitions 25, which form the side walls of the hopper. The top of the partitions 25 diverge outwardly to form a funnel shaped opening 47 to facilitate filling the hopper with particulate material. To optimize the storage space of both the side compartments and the hopper, the side walls 25 of the hopper diverge outwardly from the funnel throat 48 towards the base 15 of the housing. Thus a relatively large storage space is provided near the bottom of the hopper to compensate for the comparatively small space in the vicinity of the throat 48. However, by adopting this configuration a large storage space can be obtained near the top of the side compartments, which diminishes nearer the bottom as the side walls 25 diverge.

The bottom edges 30 of the lower part of the partition members 25 are spaced from the base 15 and are each provided with an adjustable panel member 31 connected thereto. The bottom edges 29 of the panel members 31 are also spaced from the adjacent base member 15 so as to form openings 32 through which the particulate material stored within the hopper may be discharged into troughs 35 spanning the length of each of the housing sides 14.

The troughs 35 are contiguous with the base 15, each having a valley 49 disposed beneath and outwardly from the bottom edges 29 of the panel members to facilitate the gravity feed action of the hopper.

The base 15 is further provided with an inverted 'V' shaped projection 34 into the hopper thus forming opposite sloping surfaces 36a, 36b to further assist the gravity feed of particulate material into the respective troughs 35a, 35b. In cross-section, as shown in FIG. 4, the overall combination of the troughs and base form a 'W' shape.

Each side compartment 20 has a mesh member 38 defining the outer side thereof which extends essentially the entire length of the housing sides 14. The mesh members 38 are disposed in inclined planes relative to the central vertical axis of the housing such that the top edges 39 of the respective members are spaced from the top of the partitions 25 to form an opening 41, and converge towards the partitions at their bottom edges 40, whereat the two are conjoined.

The holes in the mesh member 38 are of sufficient size to allow a horse to feed from the compartment in addition to being able to retain a quantity of hay or straw-like material therein.

To provide protection from the weather to the stored contents of the feeding apparatus, the lid 13 is adapted to cover both openings 47 and 41 of the hopper and side compartments respectively. This protection is augmented by the general 'V' type shape of the feeding apparatus wherein the respective mesh members 38 are inclined inwardly from the top of the housing thereby affording the troughs 35 and the side compartments 20 protection by the overlying nature of the lid 13.

In order to facilitate opening and closing of the lid 13, a folding support arm 43 is attached to respective ends thereof and to the top edges 42 of the ends walls 12.

Figure 3:
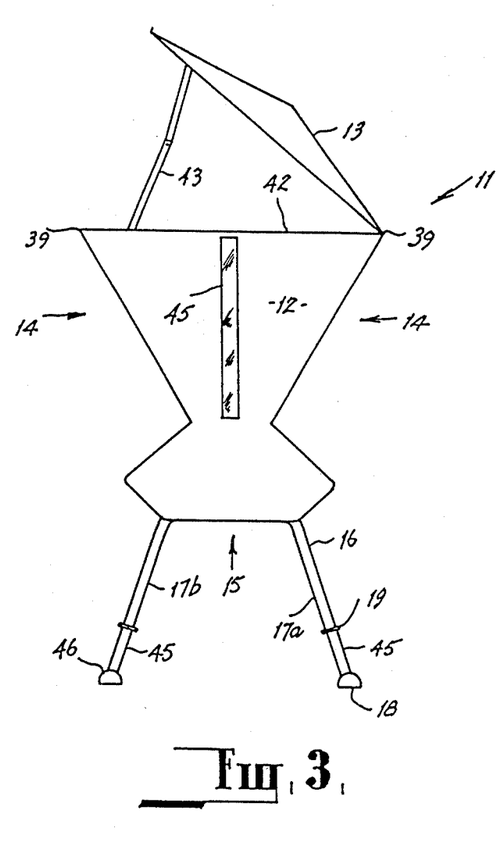
FIG. 3 is an end elevation of the feeding apparatus in FIG. 1 with the lid thereof opened.

Now describing the operation of the feeding apparatus, the lid 13 is opened, as shown in FIG. 3. The central hopper 21 may then be filled to capacity with chaff or grain. As the hopper utilises a gravity feed means, some of this fodder will flow into the adjacent troughs 35 thereby filling them until the level of the fodder is in balance with the size of the openings 32 at the base of the hopper. The size of the opening 32 may be adjusted to conform to the consistency of the fodder stored within the central hopper 21 and to regulate the level of fodder resident within the trough 35, simply by adjusting the panel members 31 by using the wing nuts 44.

The side compartments 20 may be filled with hay or straw-like fodder, which is retained therein by the effect or the mesh member 38. An animal can then station itself at the housing and feed at will from chaff or grain lying within the trough and hay or straw through holes in the mesh member.

Thereafter, the fodder stored within the feeding apparatus may be replenished in accordance with the demands of the animals feeding therefrom. Replenishment of one compartment may be easily performed independently from that of another compartment or the hopper, without adversely disrupting the contents remaining therein.

Furthermore, the feeding apparatus allows storage of fodder within the central hopper 21 particularly, for long periods of time. If wet weather conditions adversely affect the fodder residing within the troughs 35, it is a simple matter to clean sodden grain out from them and allow a new, dry supply of grain to flow into them from the hopper.

The feeding apparatus may also include a transparent window 45 made from suitable material to enable checking of the contents of fodder stored within the central hopper 21. As shown in FIG. 3, the window 45 is centrally disposed within an end wall 12 of the housing 11.

Figure 5:
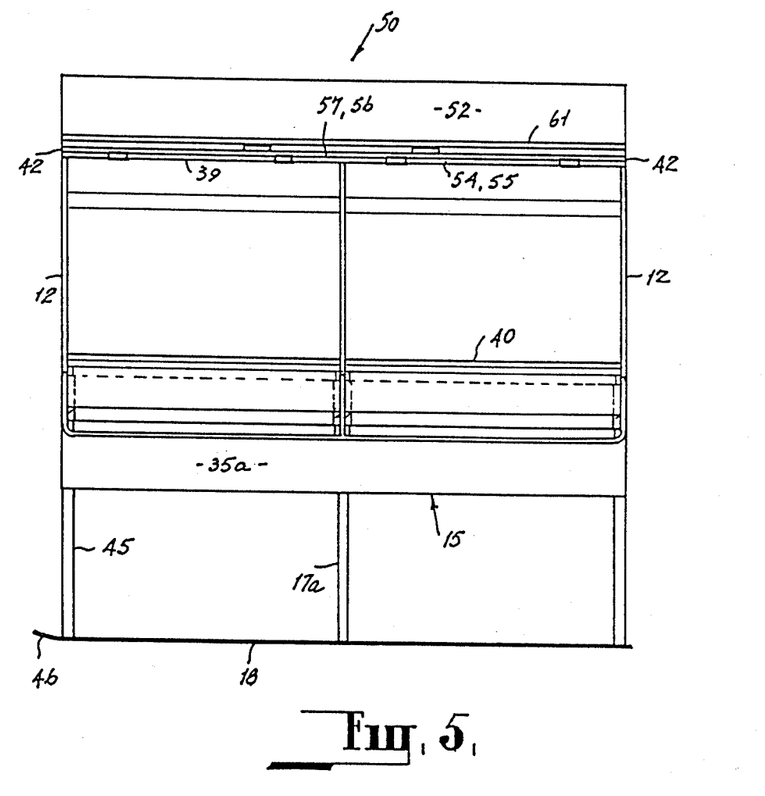
FIG. 5 is a side elevation of the feeding apparatus according to the second embodiment with the mesh member removed.
Figure 6:
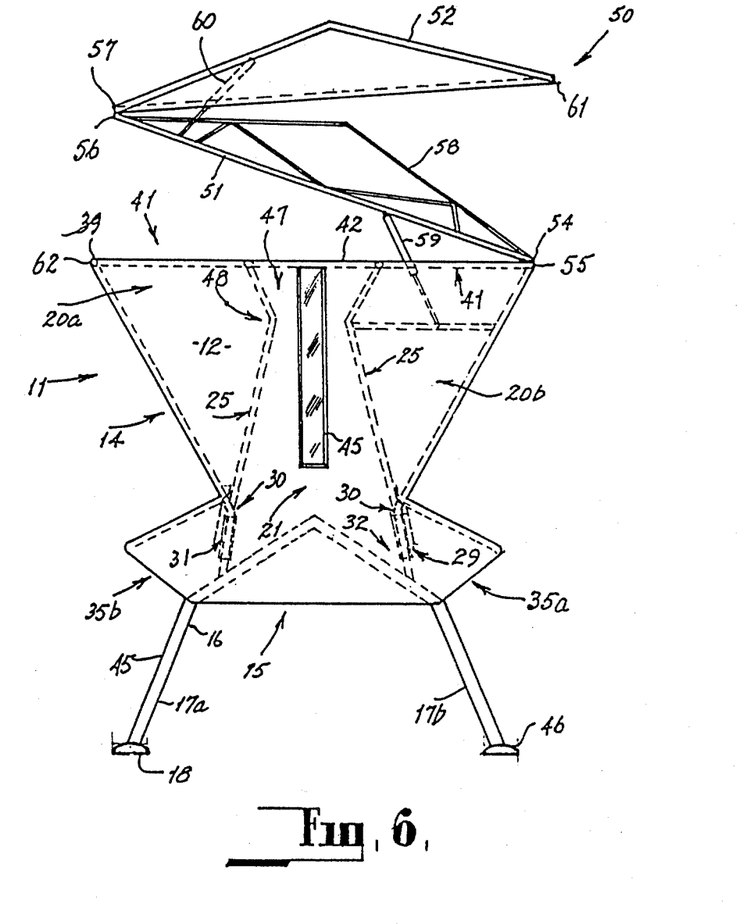
FIG. 6 is an end elevation of the feeding apparatus in FIG. 5.

The second embodiment of the invention is substantially the same as the previous embodiment except that the covering lid for the upper openings of the hopper and side compartments has been modified, as shown in FIGS. 5 and 6.

In the present embodiment, the lid, generally shown at 50, comprises an intermediate sub-frame 51, and a top cover 52. Both the sub-frame and cover are rectangular in plan corresponding to the upper periphery 39, 42 of the housing. The sub-frame side 54 is pivotally connected about a horizontal axis to the upper periphery side 55 to allow movement thereof relative to the housing 11. The opposite sub-frame side 56 is similarly connected to the cover side 57 to allow relative movement between the sub-frame and the cover. To provide additional support to the sub-frame a central A-frame 58 is formed normal to both the sub-frame sides 54, 56 and extends vertically so that the top of the frame can nearly or actually engage the underside of the cover 52 when the cover is brought down in juxtaposition with the sub-frame.

Gas lifters 59, 60 are provided in preference to the folding support arm referred to in the previous embodiment to assist opening and closing of the lid. These are arranged preferably in sets intermediate the centre and ends of the lid and housing, one set 59 mounted between the housing and sub-frame, and the other set 60 mounted between the subframe and cover.

The provision of the double-jointed lid is to facilitate access to the upper openings of both side compartments 20 and hopper 21.

In operation, the free side 61 of the cover 52 is normally locked into engagement with the sub-frame side 54 by suitable means (not shown), and the opposite sub-frame side 56 is unfastened from connection (not shown) with the corresponding housing side 62. With the aid of the gas lifters 59, the lid can be easily raised and lowered to enable the side compartment 20a and the central hopper 21 to be easily replenished from the housing side 62. To replenish or access the other side compartment 20b or the hopper 21 from the opposite side of the housing, the subframe side 56 is locked into engagement with the housing side 62, and the free side 61 of the cover is unfastened from connection with the sub-frame side 54. Accordingly, the free end of the cover may be easily raised or lowered with the aid of the other gas lifters 60 relative to the subframe and housing to enable easy access to the upper openings of the hopper and side compartment 20b.

It should be appreciated that the scope of the invention is not limited to the scope of the particular embodiments described herein. In particular, the feeding apparatus is not expressly for use by equine stock alone, but may be adapted for use by other kinds of animals. In addition, the apparatus is not limited to a dual side feeder, but may consist of only a single side feeding arrangement comprising a single side compartment and trough used in relation with a hopper.

I claim:

1. A feeding apparatus for animals comprising: a hopper for containing particulate fodder having an upper filling opening and a lower discharge opening; a compartment adjacent said hopper for containing straw-like fodder and defined at least in part by an outer perforate feeding side and upper filling opening; said perforate feeding side being inclined inwardly from its upper edge to its lower edge, a trough disposed near said lower edge of said hopper perforate side and disposed to receive fodder discharged from said hopper lower discharge opening by gravity feed action; said trough being defined by an opening that is inclined outwardly from said perforate feeding side lower edge to the lower edge of said trough opening, and a single lid covering both said upper filling openings; said hopper and compartment being separated and defined in part by a common upstanding partition member, said partition being imperforate and extending from said filling opening downwardly into contact with said perforate feeding side lower edge to define said compartment for containing straw-like fodder on one side thereof and beyond to a position within said trough, the other side of said partition cooperating to define said hopper for containing particulate fodder, the upper edge of said partition dividing said filling openings from each other, said perforate side generally overlying said trough to enable an animal to feed from both the compartment and trough.

2. A feeding apparatus as claimed at claim 1, wherein said apparatus has compartments disposed at opposite sides of said hopper, each separated on its inner side from said hopper by a partition member as defined, the single lid covering all of the filling openings when closed.

3. A feeding apparatus as claimed at claim 1, wherein the partition is generally inclined in cross-section to provide optimum storage facility for the compartment in the region of the upper opening thereof and optimum storage facility for the hopper in the region of the lower opening thereof.

4. A feeding apparatus as claimed at claim 1, wherein the upper opening of said hopper is funnel shaped to facilitate filling of the hopper and to augment the optimum storage facility of said compartment.

5. A feeding apparatus as claimed at claim 1, wherein the lower edge of the partition is adjustable to selectively control the amount of fodder discharged into said trough.

6. A feeding apparatus as claimed at claim 1, wherein said lid is pivotally mounted to the apparatus about a horizontal axis.

7. A feeding apparatus as claimed at claim 6, wherein said lid comprises a cover and linkage, said cover being pivotally connected to one end of said linkage to provide pivotal movement about a first horizontal axis, and the other end of said linkage being pivotally connected to the assembly to provide pivotal movement about a second horizontal axis, whereby the cover may be moved independently from, or in conjunction with, said linkage to facilitate access to said upper openings from either side of the apparatus.

8. A feeding apparatus as claimed at claim 1, wherein said apparatus is provided with mechanical lifting means to at least assist opening and closing of the lid.

9. A feeding apparatus as claimed at claim 1, wherein said apparatus is provided with an indicating means to provide a visual indication of the contents of the hopper.

10. A feeding apparatus as claimed at claim 1, wherein the single lid comprises a first member pivotally connected to the upper edge of one of the perforate feeding sides for movement about a horizontally extending axis and extending across to the upper edge of the opposite side and a second member pivotally connected to said first member at said opposite side for movement about a horizontally extending axis, said second member extending back to the first side of the first member and forming a closure therefor whereby said first and said second members may be pivoted together as a unit about the pivotal axis of the first member to the first side or wherein the second member may be pivoted relative to the first member about the pivotal axis at the other side for affording access to the filling openings from either side of the feeding apparatus.

11. A feeding apparatus for animals comprising: a hopper for containing particulate fodder having an upper filling opening and a lower discharge opening; a pair of compartments each positioned adjacent an opposite side of said hopper for containing straw-like fodder having an outer perforate feeding side and upper filling opening; a pair of troughs each disposed near the lower edge of a respective one of said hopper perforate sides and disposed to receive fodder discharged from said hopper lower discharge opening by gravity feed action; and a single lid covering all of said upper filling openings; said hopper and each of said compartments being separated and defined in part by a respective common upstanding partition member, each of said perforate sides generally overlying a respective one of said troughs to enable an animal to feed from both the compartment and trough at either side of said apparatus, said single lid comprising a first member pivotally supported at one side thereof to the upper edge of one of said perforate sides for movement about a horizontally disposed axis and extending to the other of the hopper perforate sides and a second member pivotally connected to said first member contiguous to said other perforate member side about a horizontally extending axis, said other member extending to the pivotal connection of the first member to the first perforate side and forming a closure therefor, said first member and said second member being pivotal as a unit for offering access to all of said upper filling openings from one side of said feeding apparatus and said second member being pivotal relative to said first member for offering access to all of said upper filling openings from the other side of said feeding apparatus.

* * * * *